(No Model.)
14 Sheets—Sheet 2.
W. COOPER.
HYDROPNEUMATIC MOTOR.
No. 504,670. Patented Sept. 5, 1893.
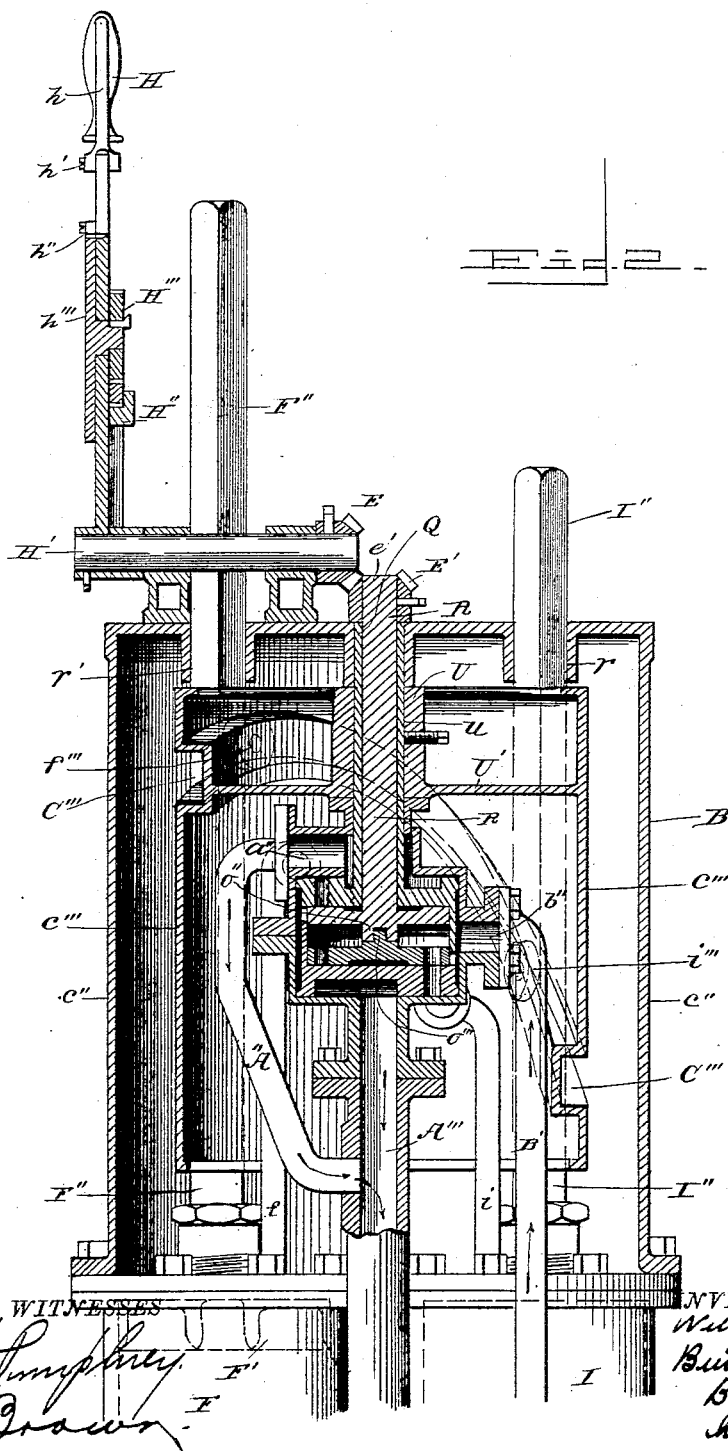

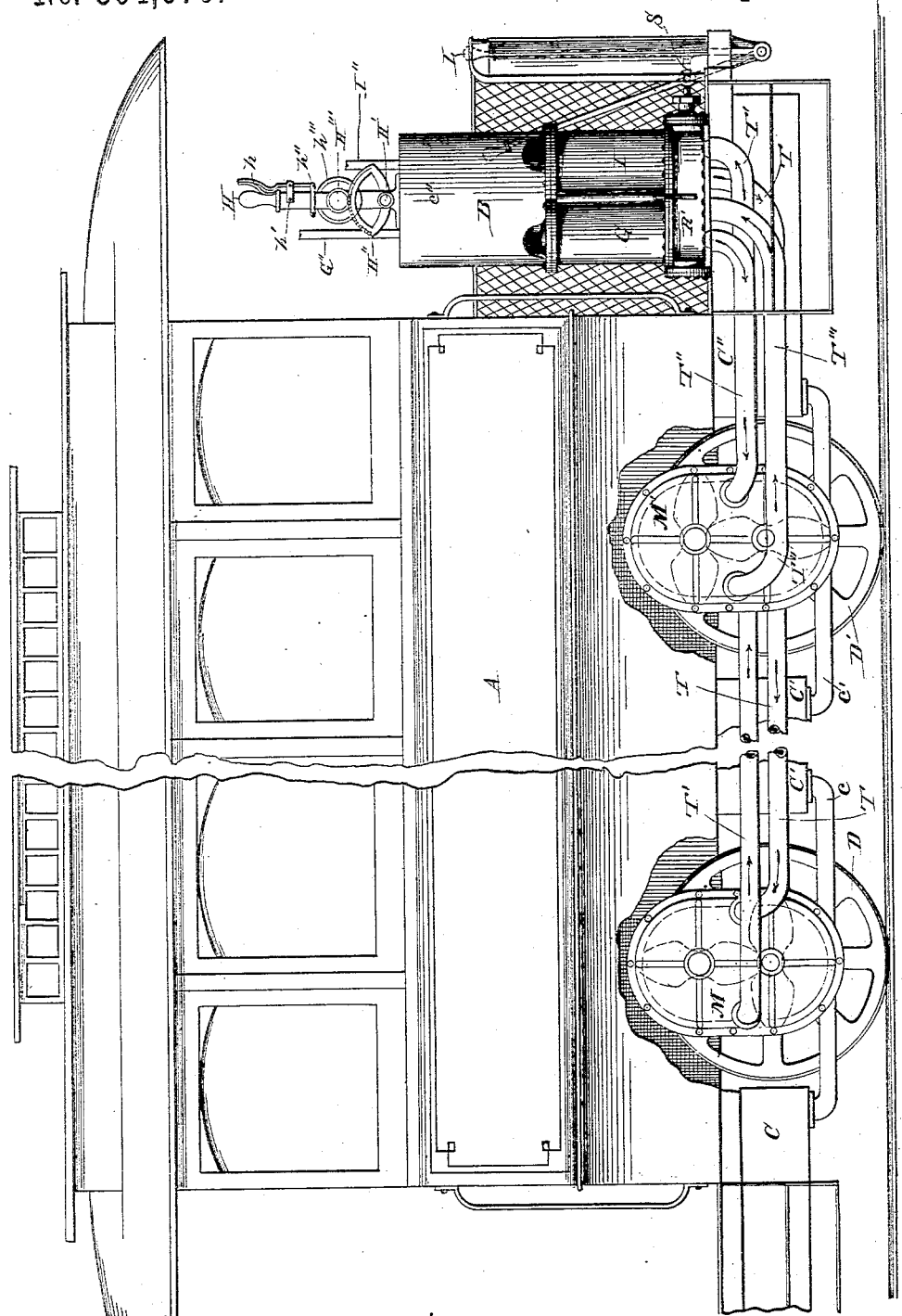

(No Model.) 14 Sheets—Sheet 3.
W. COOPER.
HYDROPNEUMATIC MOTOR.
No. 504,670. Patented Sept. 5, 1893.
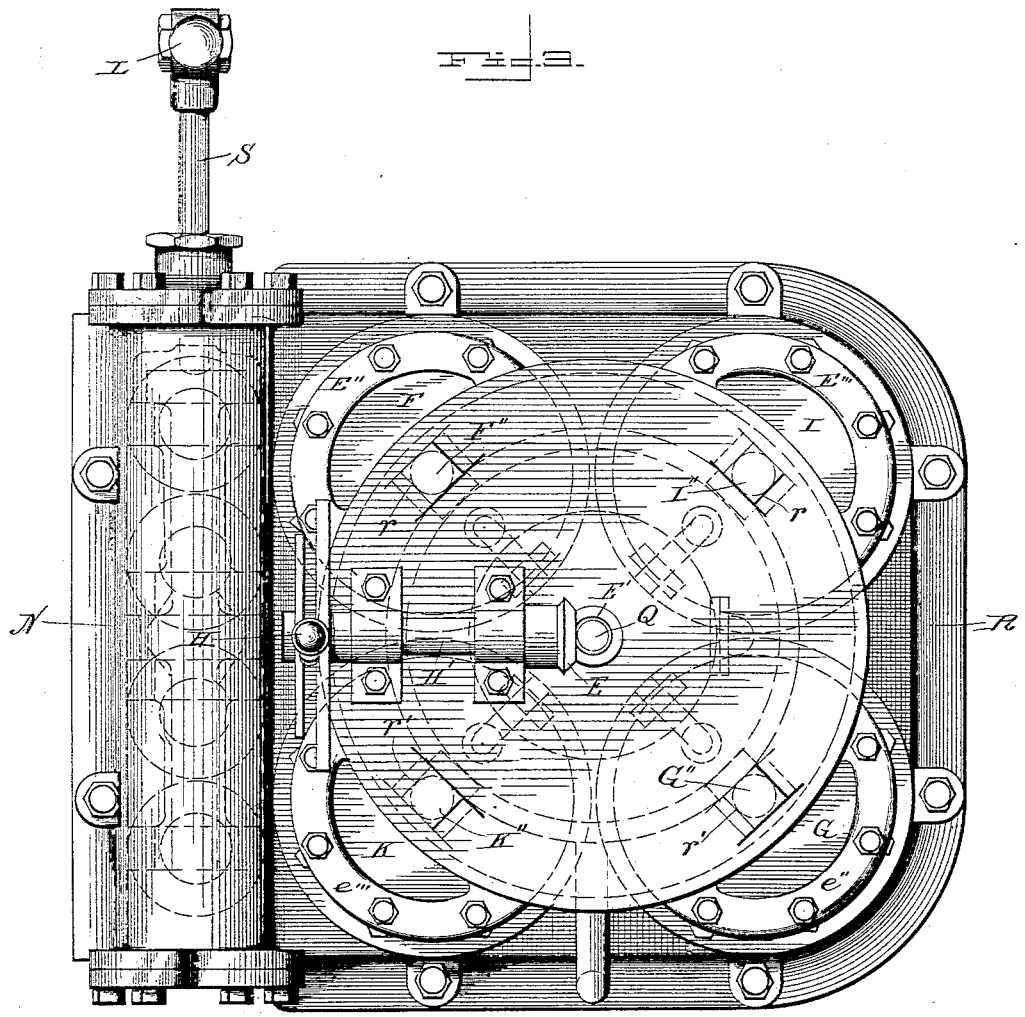
WITNESSES
INVENTOR
William Cooper
Butterworth, Hall, Brown & Shutts
his Attorneys

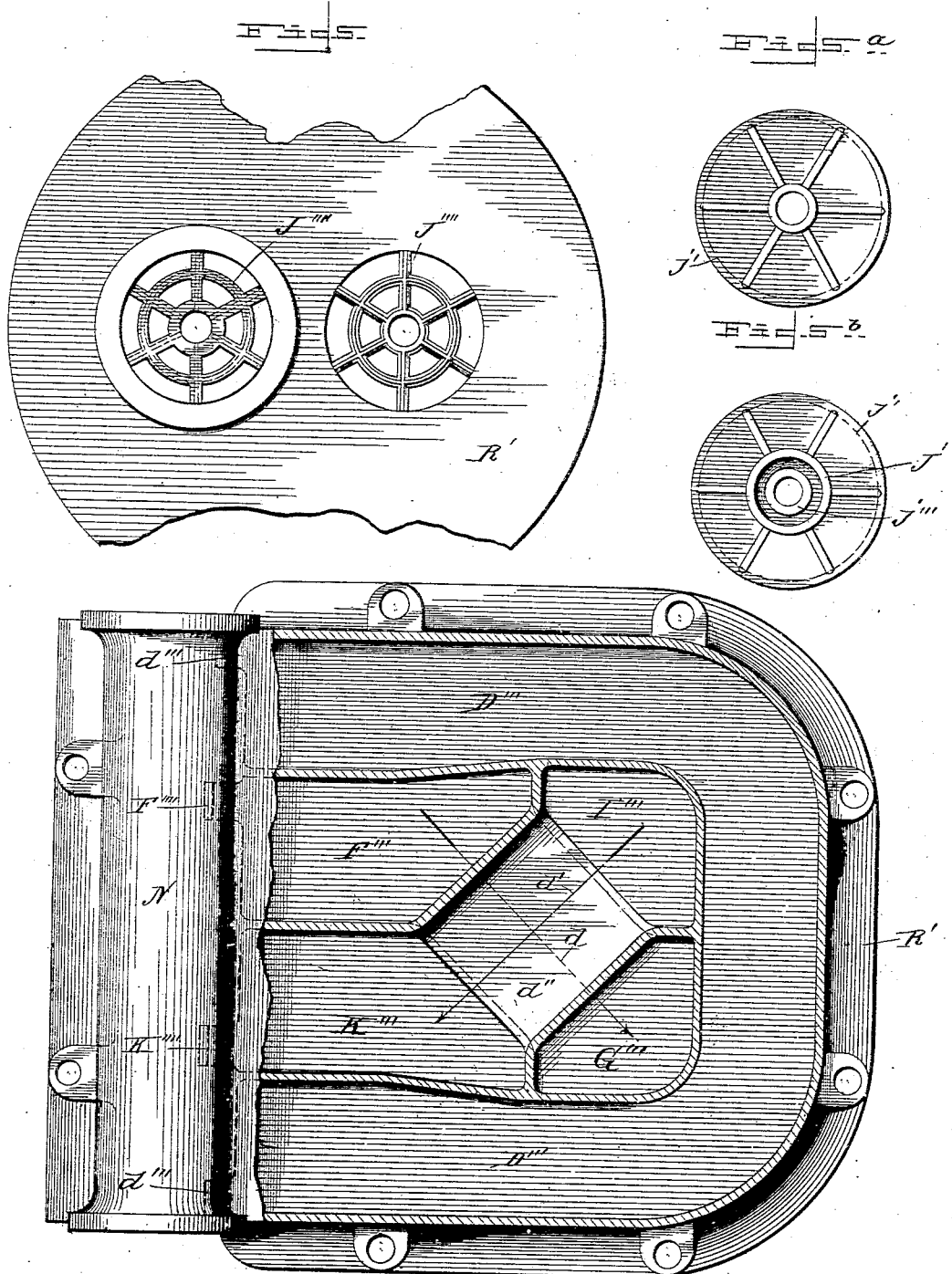
(No Model.)
W. COOPER.
HYDROPNEUMATIC MOTOR.
No. 504,670. Patented Sept. 5, 1893.
14 Sheets—Sheet 4.

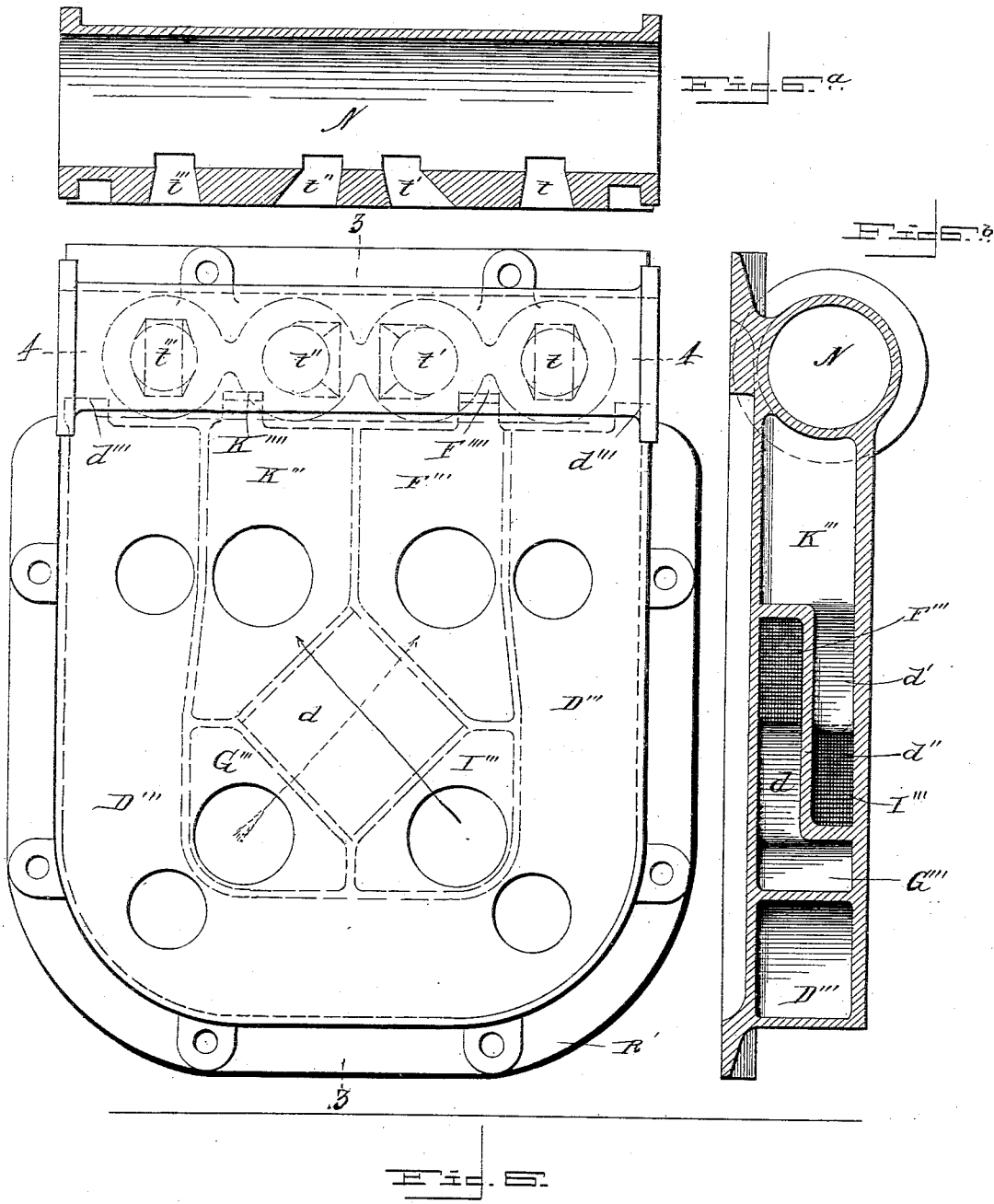

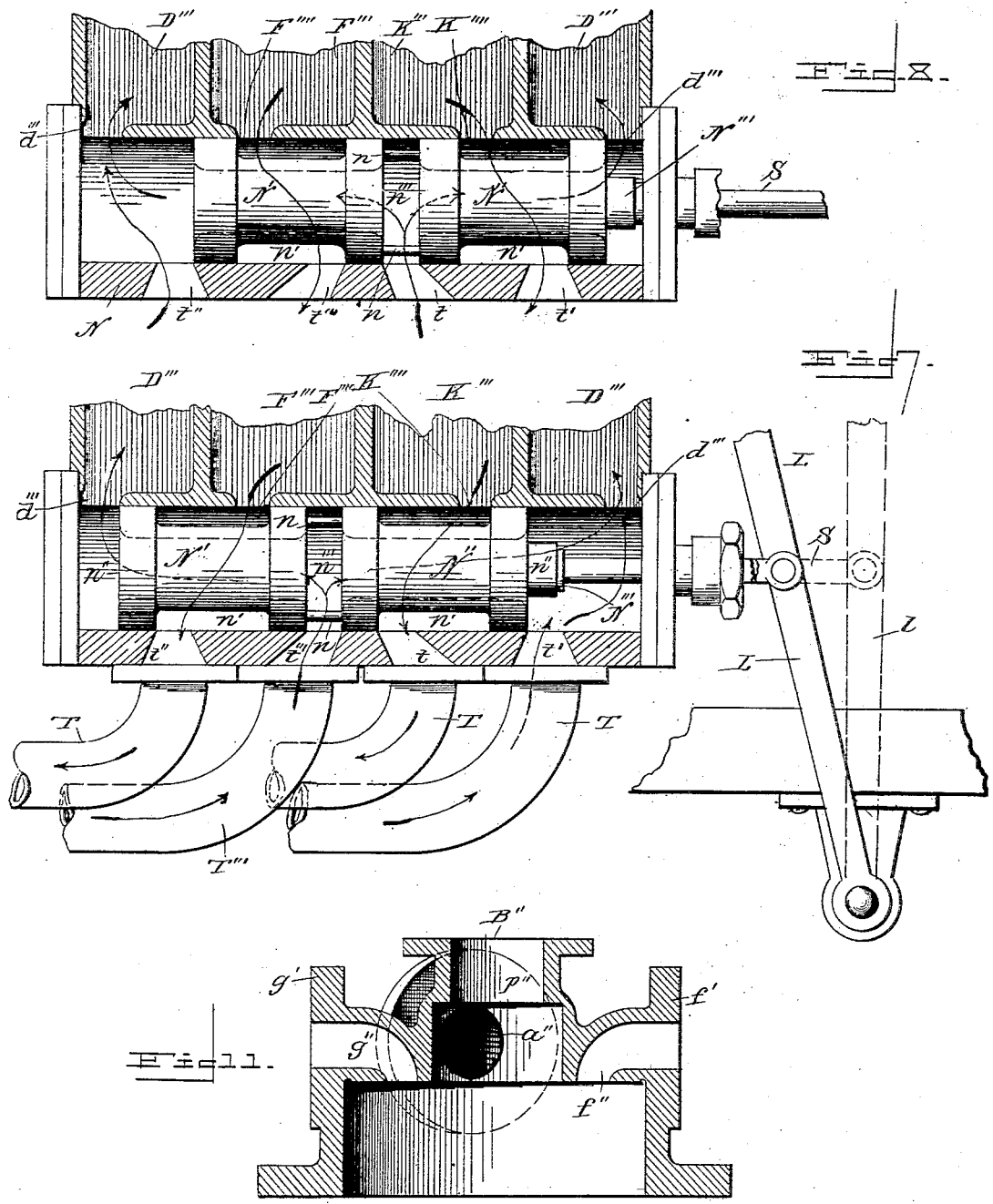

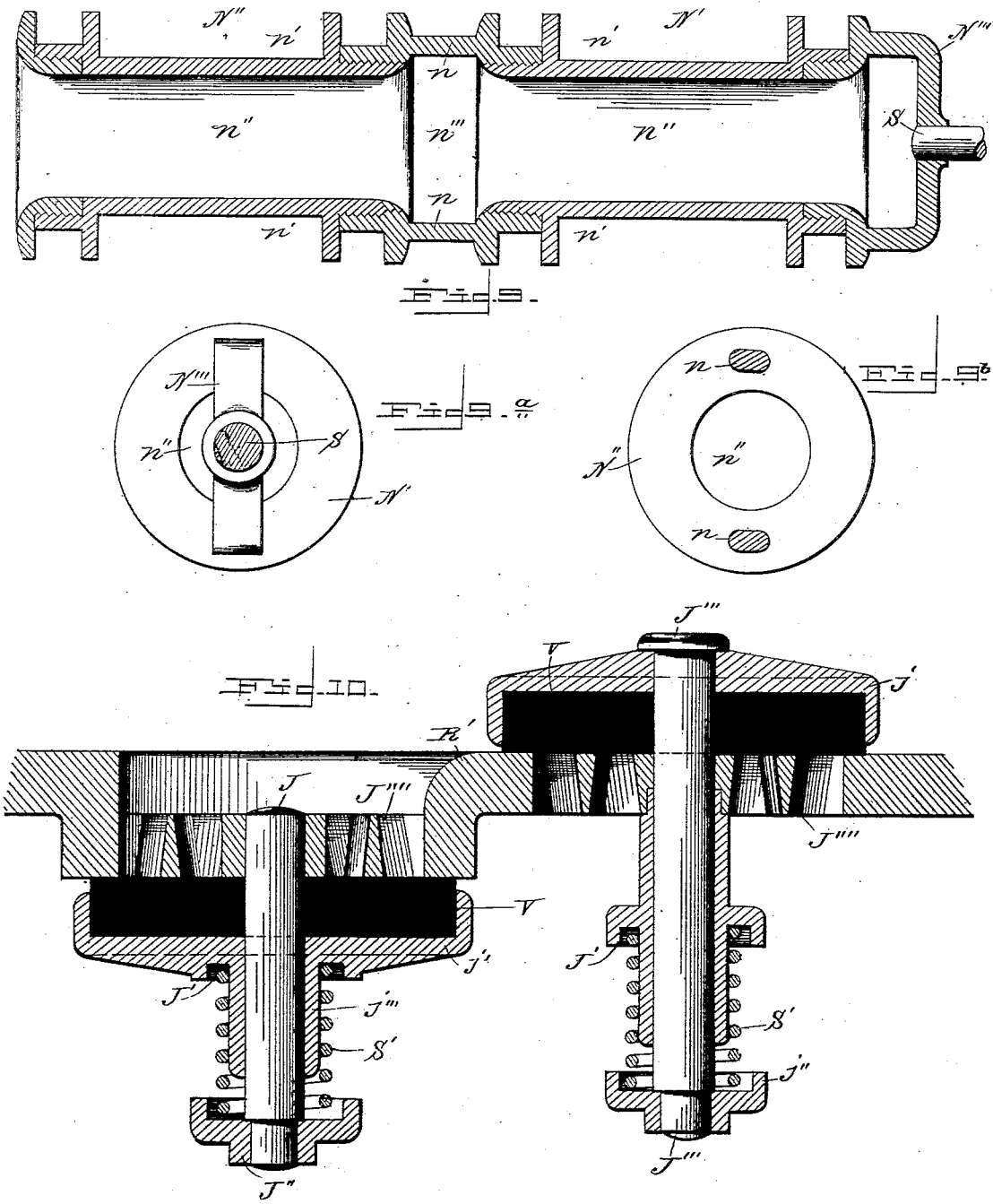

(No Model.) 14 Sheets—Sheet 8.
W. COOPER.
HYDROPNEUMATIC MOTOR.
No. 504,670. Patented Sept. 5, 1893.
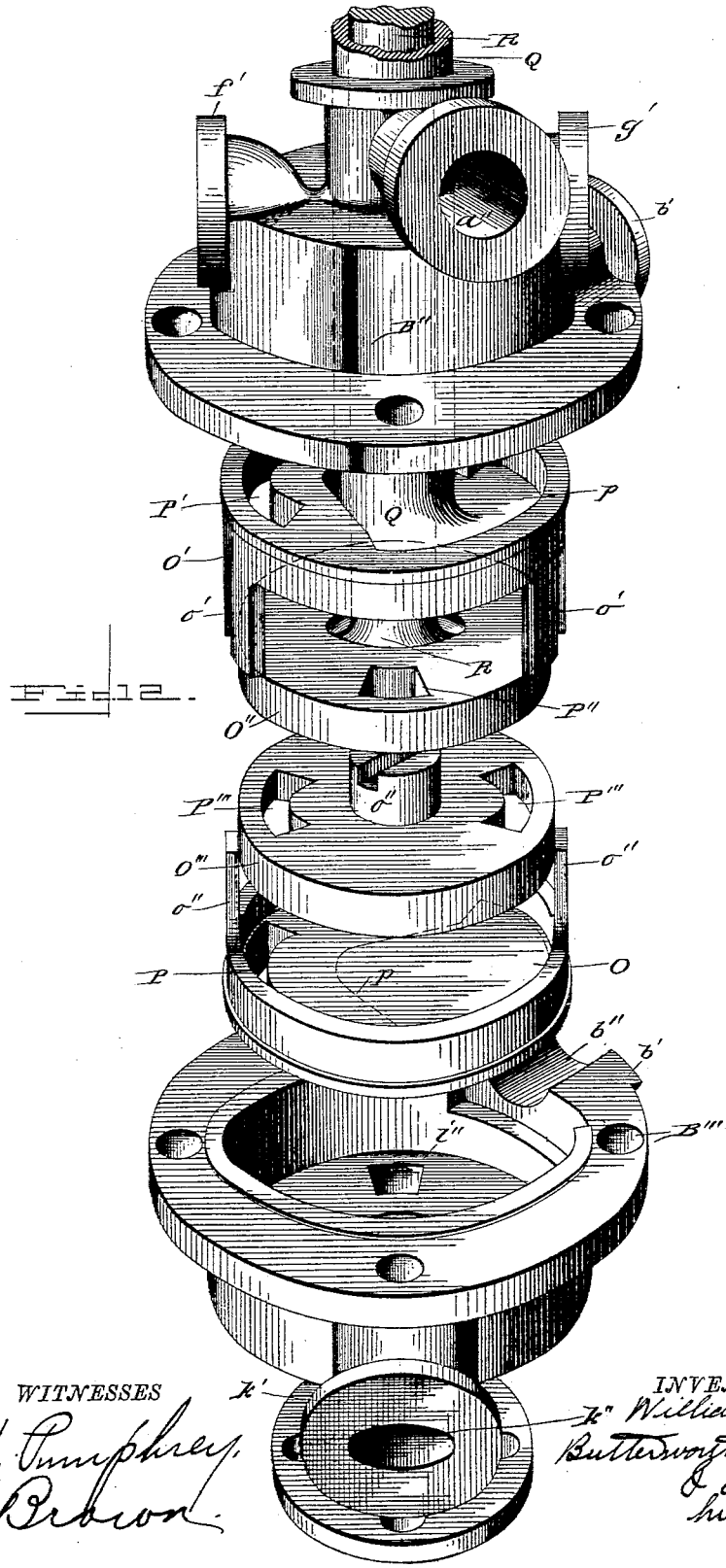

(No Model.) 14 Sheets—Sheet 9.
W. COOPER.
HYDROPNEUMATIC MOTOR.
No. 504,670. Patented Sept. 5, 1893.
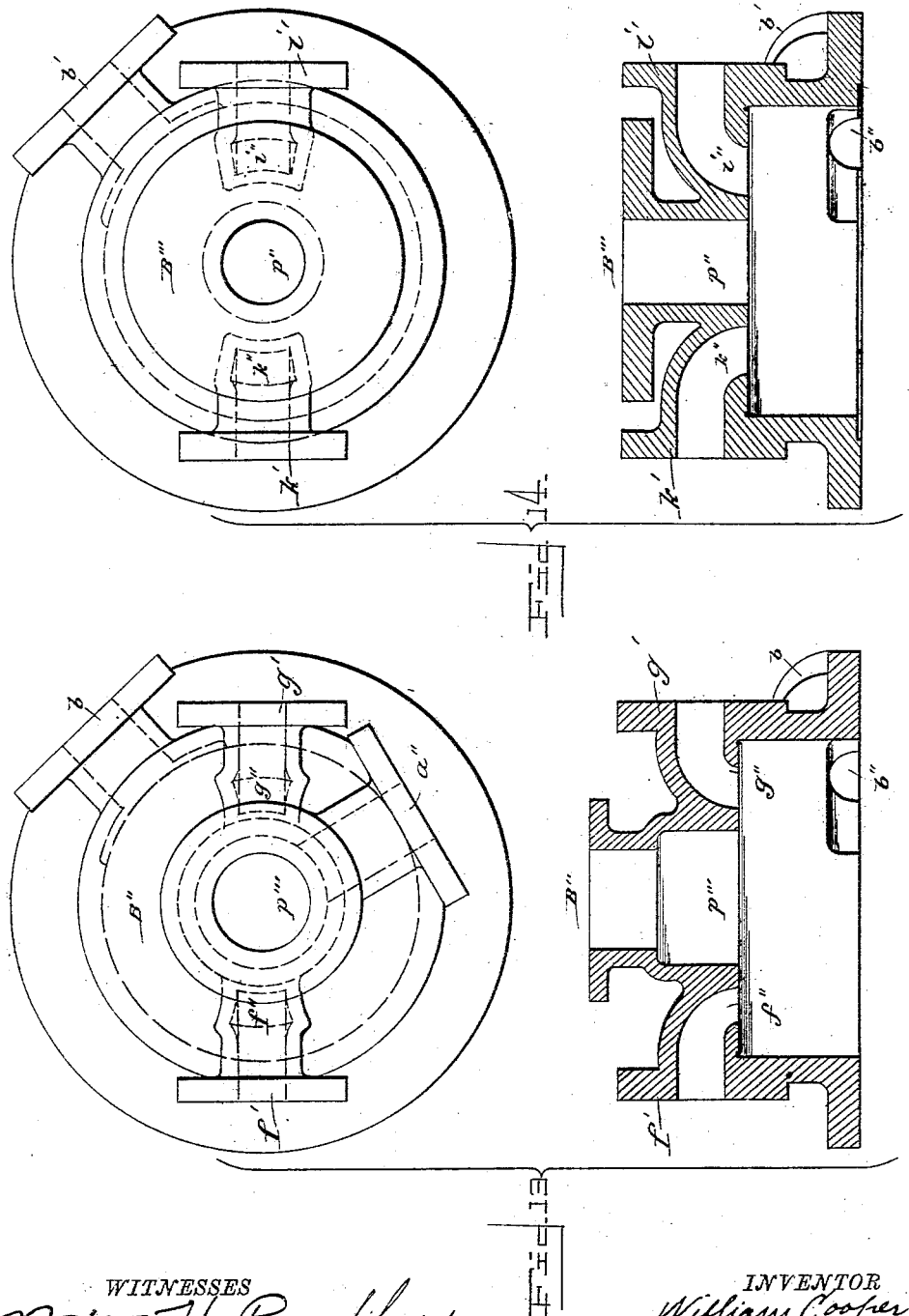
WITNESSES
INVENTOR
William Cooper
Butterworth, Hall, Brown & Smith,
his Attorneys

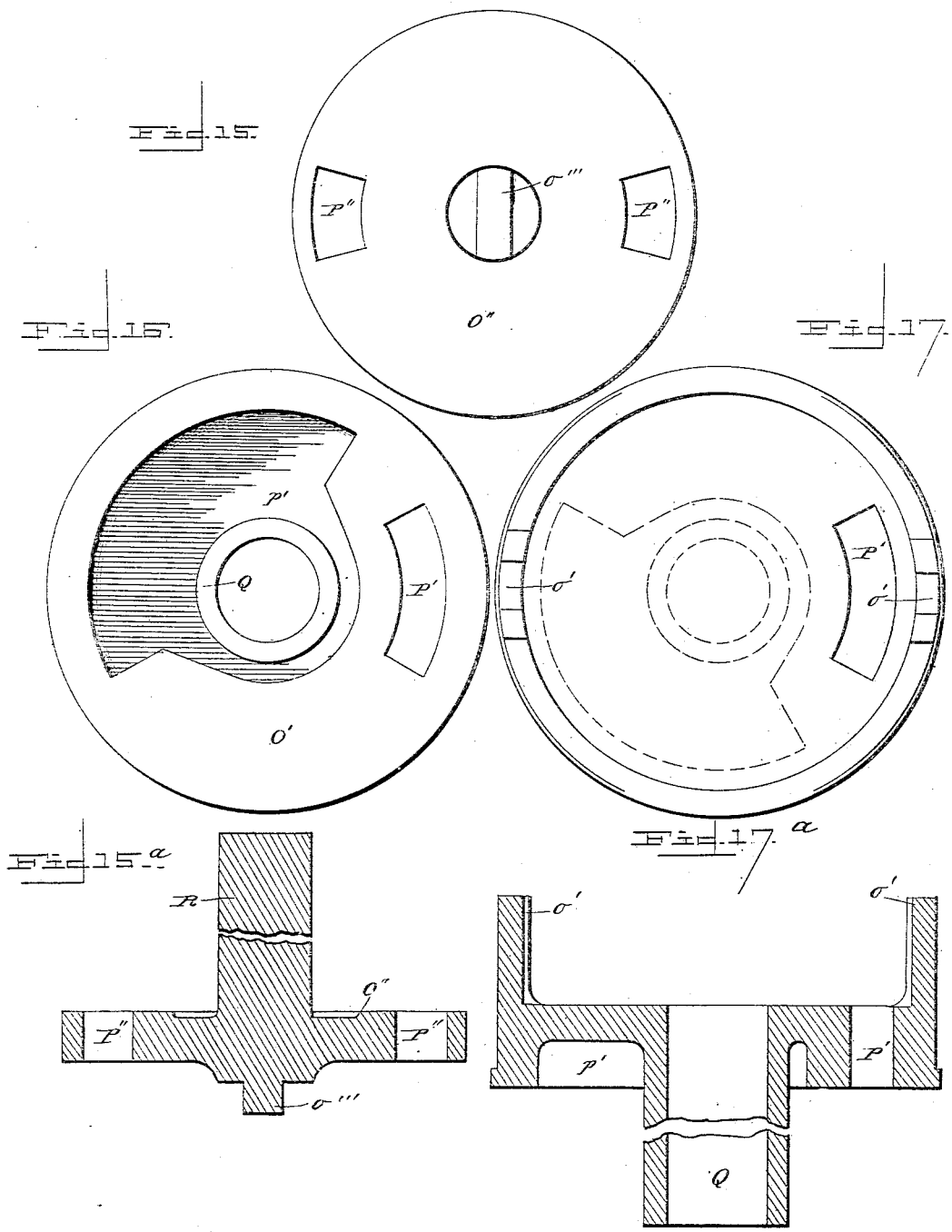

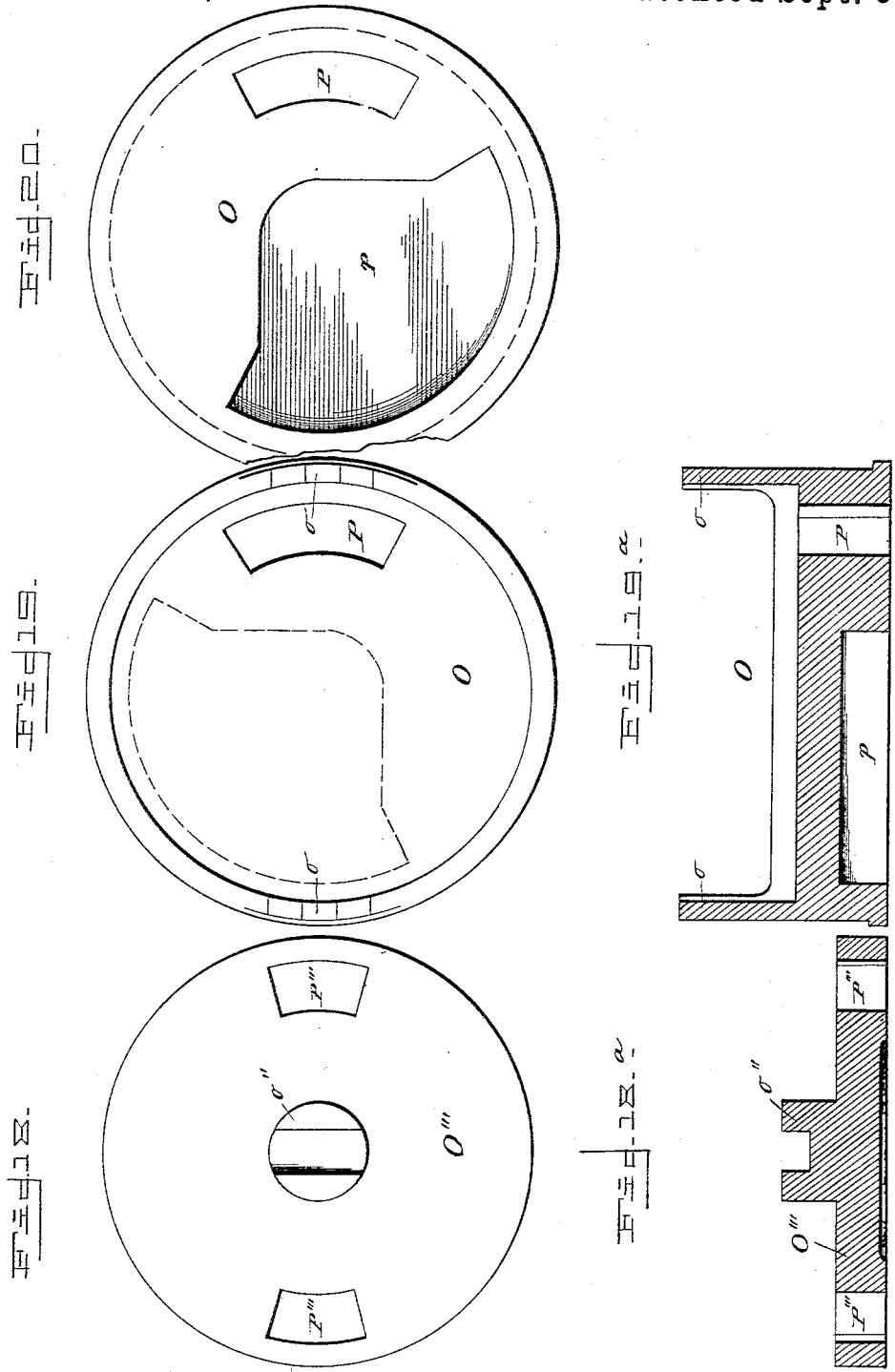

(No Model.)

14 Sheets—Sheet 12.

W. COOPER.
HYDROPNEUMATIC MOTOR.

No. 504,670.  Patented Sept. 5, 1893.

WITNESSES

INVENTOR
William Cooper by
Butterworth, Hall, Brown & Smith
his Attorneys (No Model.) 14 Sheets—Sheet 13.

W. COOPER.
HYDROPNEUMATIC MOTOR.

No. 504,670. Patented Sept. 5, 1893.

WITNESSES
Walter H. Pumphrey.
T. H. Brown.

INVENTOR
William Cooper by
Butterworth, Hall, Brown & Smith
his Attorneys (No Model.) 14 Sheets—Sheet 14.

W. COOPER.
HYDROPNEUMATIC MOTOR.

No. 504,670. Patented Sept. 5, 1893.

WITNESSES
Walter H. Pumphrey
F. H. Brown

INVENTOR
William Cooper by
Butterworth, Hall, Brown & Shields
his Attorneys

UNITED STATES PATENT OFFICE.

WILLIAM COOPER, OF MINNEAPOLIS, MINNESOTA.

HYDROPNEUMATIC MOTOR.

SPECIFICATION forming part of Letters Patent No. 504,670, dated September 5, 1893.

Application filed June 18, 1890. Renewed February 9, 1893. Serial No. 461,689. (No model.)

*To all whom it may concern:*

Be it known that I, WILLIAM COOPER, a citizen of the United States, residing at Minneapolis, in the county of Hennepin and State of Minnesota, have invented certain new and useful Improvements in Hydropneumatic Motors; and I do hereby declare the following to be a full, clear, and exact description of the invention, such as will enable others skilled in the art to which it appertains to make and use the same.

My invention consists in the improved form of hydropneumatic motor for use more especially in street car traction, and will be hereinafter more completely described.

Figure 21:
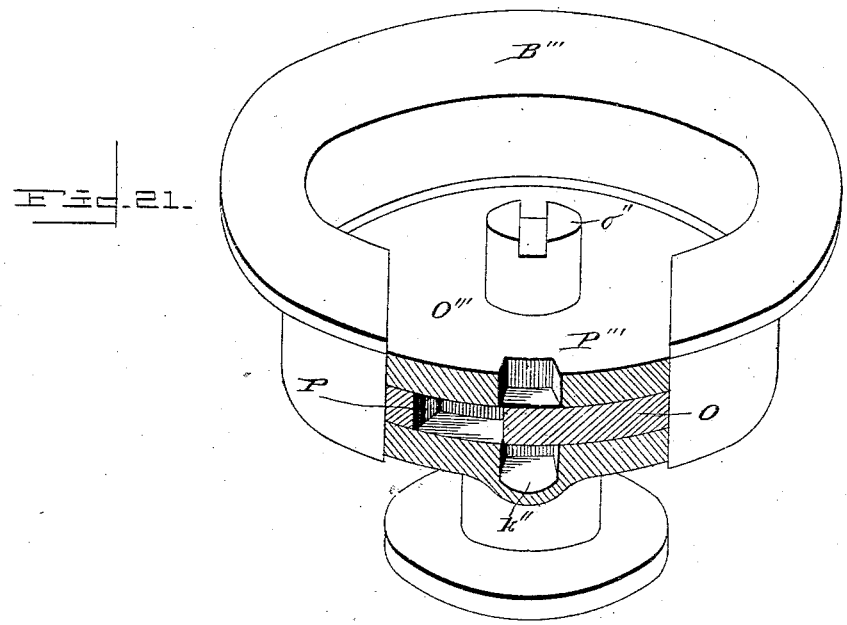
Figure 22:
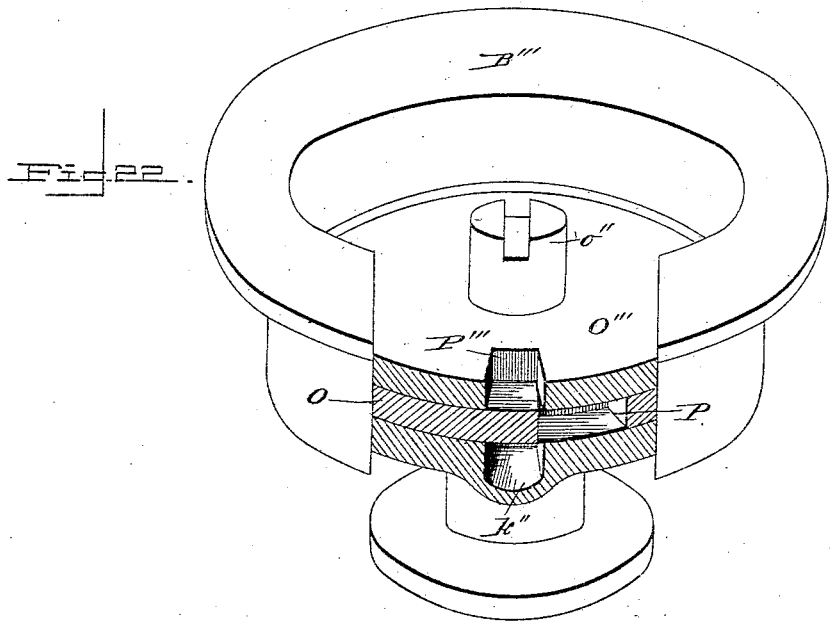
Figure 23:
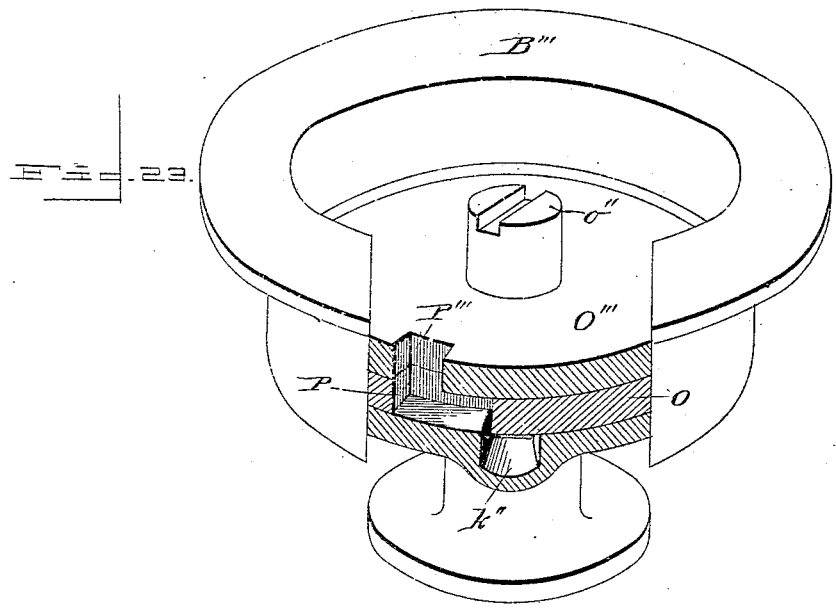
Figure 24:
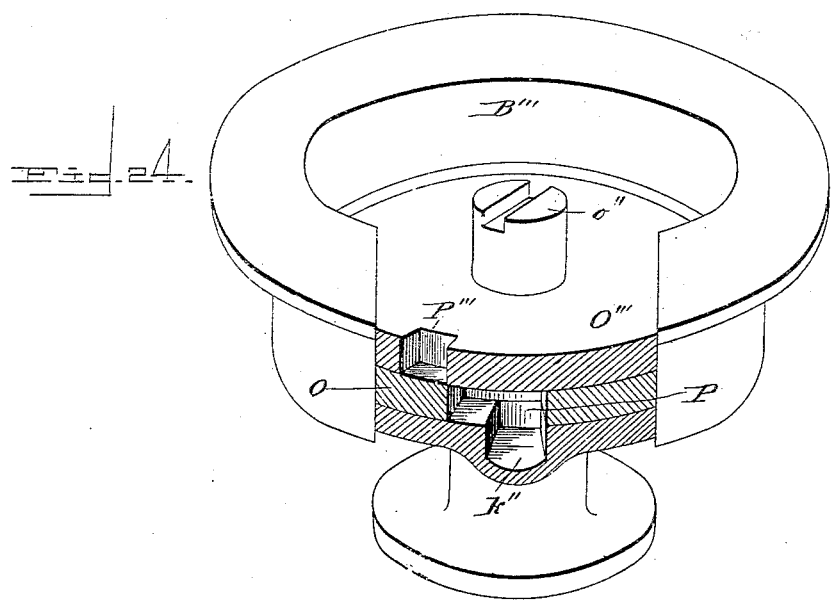
Figure 25:
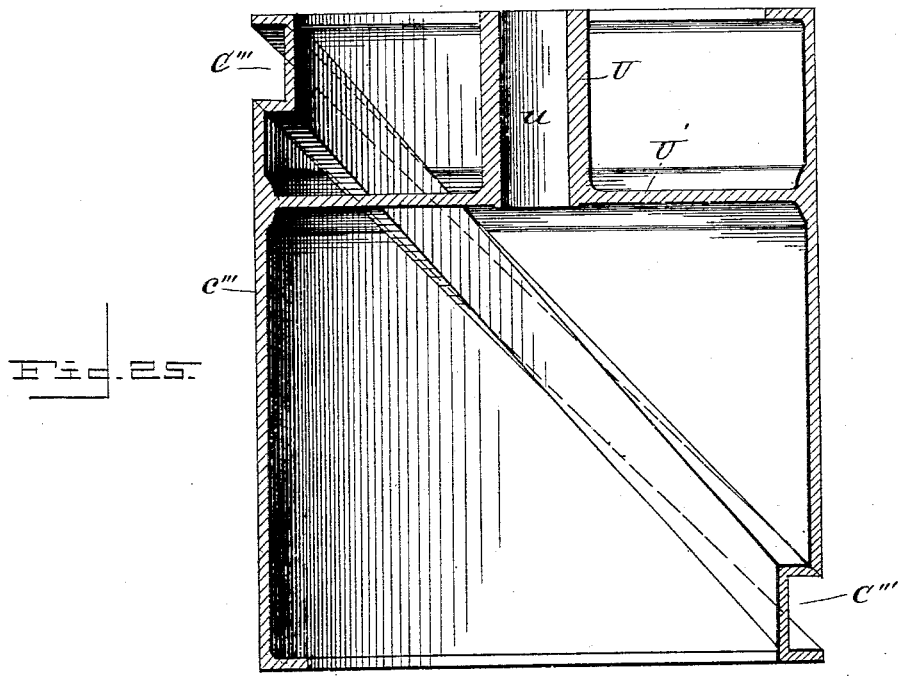
Figure 26:
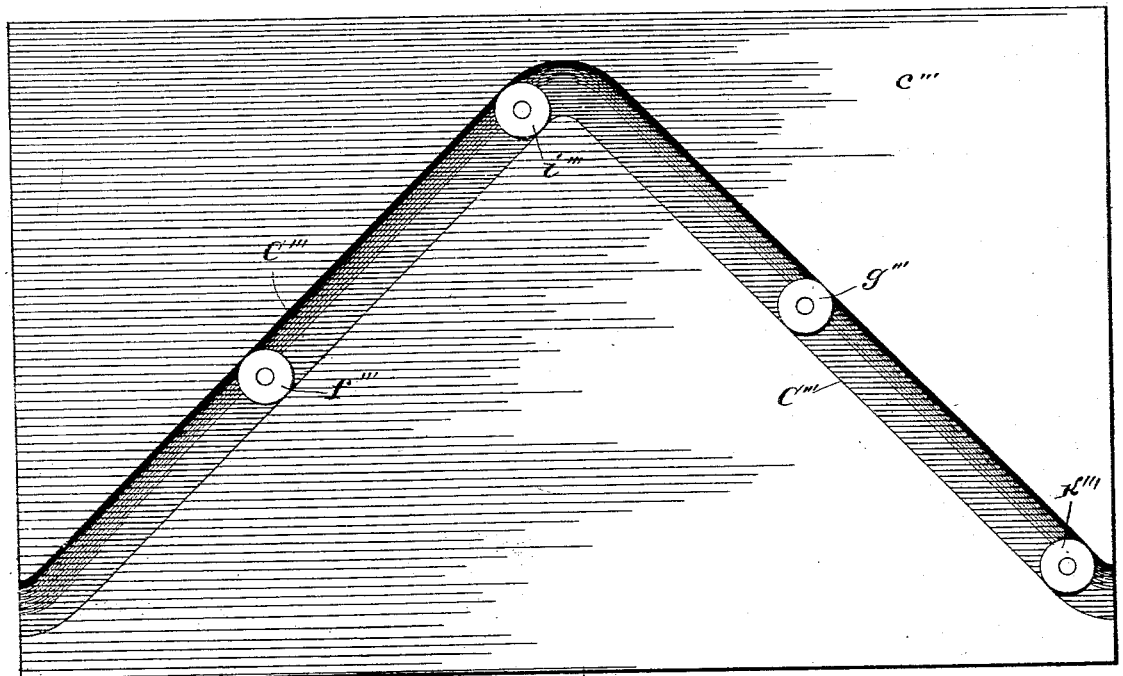

In the drawings: Figure 1, is a side view of a street car with the middle portion, and a part of the side casing, broken away, showing my improved gear applied thereto. Fig. 2, is a sectional view of the valve chest, valves and connections of the compressed air portion of my motor. Fig. 3, is a plan view of the combined gas and liquid cylinders, and their connections. Fig. 4, is a horizontal section through the base plate or valve casing. Fig. 5, is a detail bottom view of the valve plate at the liquid end of each of the combined gas and liquid cylinders. Figs. $5^a$ and $5^b$, are detailed views of the valves corresponding therewith. Fig. 6, is a plan view of the base plate or valve casing, the partitions therein being shown in dotted lines. Figs. $6^a$ and $6^b$, are vertical sections on lines 4—4 and 3—3 of Fig. 6. Figs. 7 and 8, are illustrative sectional views of the reversing and brake valve and cylinder. Fig. 9, is a detailed longitudinal sectional view of the said valve. Fig. $9^a$, is an end view; and Fig. $9^b$, a cross-sectional view of the said valve. Fig. 10, is a detailed view in section of the check valves, and a portion of the valve plate on which they are seated. Fig. 11, is a sectional view of the upper half of the valve chest, showing the exhaust opening therefrom. Fig. 12, is a perspective view of the valve chest opened, and the valves contained therein exposed. Fig. 13, is a plan view and section of the upper half of the valve chest, the section being viewed from the opposite side to that from which Fig. 11 is viewed. Fig. 14, is a plan view and section of the lower half of the valve chest. Figs. 15 and $15^a$, are respectively a plan view and a vertical central section of the upper cut-off valve. Fig. 16, is a top view of the upper main valve; and, Figs. 17 and $17^a$, are respectively a bottom view and a vertical central section of said valve. Figs. 18 and $18^a$, are respectively a top plan view and a vertical sectional view of the lower cut-off valve. Figs. 19 and $19^a$, are respectively a top plan view and a vertical section of the lower main valve. Fig. 20, is a bottom view of the same. Figs. 21, 22, 23 and 24 are illustrative perspective views, showing the operation of the cut-off valve. Fig. 25 is a vertical central section of the valve actuating cam cylinder; and Fig. 26, is a development of the surface of such cam cylinder, with the cam rollers shown in place.

My invention is an improvement of the general form of hydropneumatic motor described and illustrated in my pending applications, Serial No. 329,457, filed November 6, 1889, and Serial No. 335,754, filed January 3, 1890; in which is set forth the broad idea of the use of a positively acting hydraulic motor for traction purposes, when operated by a quantity of oil or other liquid forced through said motor by the pressure of compressed air applied to said liquid alternately in either of two connected tanks or cylinders. I have found that with the use of only two of such tanks or cylinders, there is apt to be a moment of inaction during the reversal of the compressed air inlet valves, and also a considerable inequality in the action of the motor if an attempt is made to use the compressed air expansively, that is by cutting off the supply to the tank at a certain point, and permitting the amount of compressed air already in the tank to expand to a lesser pressure. To overcome these difficulties and to provide an apparatus in which the compressed air may be used expansively as the laws of economy demand, and to provide a more efficient and compact mechanism and system of valves, I have designed the apparatus consisting of two or more pairs of combined gas and liquid cylinders, and their various attachments, herein illustrated and described, in which—

A represents a street car, its middle portion being broken away, mounted on combined traction and carrying wheels, D, D', and driven by the positively acting hydraulic motors, M, M', which have their revolving vanes geared, either directly or ultimately to he axles of the driving wheels D, D'.

B represents the combined gas and liquid cylinders and their attachments, and C, C', C'' represent storage tanks in which a charge of air or gas is compressed at a considerable pressure. These tanks are connected by suitable air pipes $c$, $c'$, so that they form virtually one reservoir; and from this reservoir a pipe, not shown, leads to the distributing valves of the hydropneumatic motor. The flow of oil or other liquid set up in said hydropneumatic motor by the air pressure is led through the pipe T, through the motor M, back through the pipe T', or in a reverse direction, and through the pipe T'', through the motor M', back through the pipe T''', or in the reverse direction. The reversal of said flow is controlled by the reversing lever L operating the valve stem S of the combined reversing and brake valve.

The chambers or tanks in which the compressed air or gas or any suitable elastic fluid under pressure is admitted to exert its force upon the quantity of oil or other liquid also in said chamber, may be, of course, of any suitable form, but they are preferably cylindrical in shape and are represented in the drawings (Fig. 3) by the reference letters F, G, I, and K; F and G being a pair which operate alternately one with the other, while I and K are a second pair operating alternately one with another and at a point midway between the phases of action of the first pair of cylinders. Each of these cylinders has a piston, F', G', I', and K', reciprocating therein, and forming a partition between the compressed air or gas, or other elastic fluid, admitted to the gas end of the cylinder, and the oil or other liquid at the liquid ends of the cylinders. Each piston has a piston rod F'', G'', I'', and K'', which has a projection or cam roller, $f'''$, $g'''$, $i'''$ and $k'''$ mounted thereon. These cam rollers mesh in a cam groove or grooves C''' in the cam cylinder $c'''$. This cam cylinder, and the valve mechanism operated thereby are inclosed in a casing $c''$ which has semi-circular feet E'', E''', $e''$, $e'''$ (see Fig. 3) bolted to the cylinder heads. This casing has polygonal shaped openings, $r$, $r'$, through which the ends of the piston rods F'', G'', I'', K'' of corresponding cross sections pass. The said piston rods are thereby guided and prevented from turning so that the cam rollers may not escape from the cam groove C'''. The cam cylinder $c'''$ is supported on a cylindrical sleeve U, by means of the web U', said sleeve and web being cast integral with the cam cylinder as shown in Fig. 25. Through the opening $u$ in said sleeve U, passes the valve stem Q of the upper main valve O' (shown in detail in Figs. 16, 17 and 17ᵃ). The cam cylinder is rigidly fastened to said spindle by means of the set screw passing through the sleeve U, as shown in Fig. 2, or some other equivalent manner. With the above described construction it is evident that the cam groove C''' being a regular ellipse, will compel the pistons and piston rods to reciprocate consecutively in regular order, each one piston being exactly half a stroke in advance of its successor, and half a stroke behind its predecessor; and that such reciprocation of the pistons and piston rods will produce a regular rotation of the cam cylinder and of the valve stem and valve O'. The valve O' has proper lugs or projections $o'$ which mesh with corresponding lugs or projections $o$ on the lower main valve O, and consequently said upper and lower main valves rotate continuously with the cam cylinder. The valve chest in which said valves rotate is composed preferably of two portions, B'' and B''' which are bolted together by bolts passing through suitable flanges. These portions of the valve chest have ports $f''$, $g''$, $i''$, $k''$, formed in their upper and lower surfaces as best shown in Figs. 13 and 14. These valve ports and their corresponding passageways are connected by pipes $f$, $g$, $i$, $k$, each with the corresponding cylinders, F, G, I, K. The pipe B' brings a supply of compressed air or gas from the reservoir or generator, C, C', C'', under the car and delivers it into the above described valve chest through the supply opening $b''$, shown in Figs. 13 and 14, the connection being made by means of the bolts and half flanges $b$, $b'$, shown in Fig. 12. The upper half B'' of this valve chest has a portion cored out so as to form a space about the valve spindle Q for a portion of its length, and from this space there is a discharge opening $a''$ for the exhaust which passes down the pipe A'' leading from said opening into the exhaust passage A''', which is connected with the lower half of the valve chest, as shown in Fig. 2, and which discharges to the open air at the lower portion of the hydropneumatic motor, as shown in Fig. 1. The main valves, whose construction is fully illustrated in Figs. 16 to 20 inclusive, have the exhaust cavities, $p$, $p'$ and the induction ports P, P', which are so arranged in their connection with the ports $f''$, $g''$, $i''$, $k''$, in the faces of the valve chest that during a quarter of the revolution of each valve, communication will be opened from the interior of the valve chest through the valve and said port to one of the cylinders, F, G, I, K, from which it follows that the compressed air supplied through the pipe B' will enter whichever of the four cylinders as is thus thrown open and will exert its pressure on the fluid on the other side of the piston therein. During the succeeding quarter of the revolution of the valve, all communication with that particular cylinder is closed, and during the remaining half of the revolution, the exhaust cavity, as $p$, opens communication from said cylinder and the port to one of the exhaust passages, as A''' and the piston in the cylinder is thereby permitted to rise with only the atmospheric pressure on it. This desired arrangement of induction and exhaust may be brought about by any one of a number of corresponding changes in the valve ports and passages, but I prefer to accomplish it by making each of the ports $f''$, $g''$, $i''$, $k''$ cover an arc of thirty degrees, while each of the passages, as P, covers an arc of sixty degrees, and the exhaust cavity, $p'$, to cover an arc of one hundred and fifty degrees, from which it follows that the main valve must rotate through an arc of sixty degrees plus thirty degrees equals ninety degrees from the first admission to the final cut-off of the induction passage, while it will rotate through one hundred and fifty degrees plus thirty degrees equals one hundred and eighty degrees from the first opening to the final closing of the exhaust.

With the above described valve apparatus a regular and uniform cut-off at the half stroke in each cylinder will be brought about under all conditions or working and the compressed air or gas supplied to said cylinders would be expanded to half its initial pressure before being released and discharged into the open air; but, it is possible with the use of elastic fluids compressed to a high tension in the reservoir to obtain a much more economical working with a high rate of expansion, and also by means of varying said rate of expansion, different amounts of power may be expended at different times to overcome the varying resistances of changing grades and loads. To accomplish this I employ a set of cut-off valves which ride upon the backs of the main rotating valves, and while adjustable within certain limits do not rotate. Various forms of cut-off valves might be employed operating upon principles well known and frequently applied in high speed steam engines, but the preferred form of valve is the one illustrated in Figs. 2, 15, 15ª, 18 and 18ª, which consists of a circular plate fitting on the back of the rotating valve, and of sufficiently great diameter to overlap the ports P, P', therein, but not sufficiently great to interfere with the lugs $o$, $o'$ that connect said main valves together. These cut-off valves have projections or lugs $o''$, $o'''$ which intermesh and cause the adjustment of said valves to be simultaneous. At opposite points in said valves are sets of ports or passage ways P'', P''' which are in line with the passage ways P, P', of the main rotating valves, but are of less angular extent. The upper cut-off valve O'', has a spindle R which passes up through the hollow spindle Q of the main valve, and connected with its end is any suitable adjusting apparatus, the preferable form of which is that illustrated in Figs. 1 and 2, consisting of a bevel wheel E' on the extremity $e'$ of the spindle R which meshes with the bevel wheel E on the shaft H'. The lever H is mounted on the shaft H' and oscillates about it as a center. This lever carries a set of spur wheels H''' and $h'''$, which are keyed together and are of different diameters. The smaller gear wheel H''' meshes with a circular tooth rack H'', which is stationary, while the larger gear wheel $h'''$, is held stationary in any desired position by the latch $h''$ which is raised and lowered by the spring trip $h$, which revolves about the center $h'$, the resulting mechanism being the form well known and commonly used for controlling locomotive throttle valves. It results that the oscillation of the lever H within certain limits will adjust the cut-off valves so that the ports P'', P''' therein will correspond more or less nearly with the ports $f''$, $g''$, $i''$, $k''$ in the valve casing, and thereby regulate the point of cut off.

The mechanism above described suffices to control the admission and exhaust of the compressed gas to and from the gas end of the combined gas and liquid cylinders and thereby to cause a regular reciprocation of the pistons therein. This reciprocation creates certain to and fro currents in the fluid confined in the liquid ends of said cylinders, and to control this flow, both automatically, and at the will of the operator, certain other portions of the apparatus which I will now describe, are employed. At the bottom of the cylinders are valve plates, portions of which are illustrated in plan view and section in Figs. 5 and 10. For each of said cylinders there is a set of two valves and valve openings, one of said valves opening outward, and the other opening inward as shown in Fig. 10. Springs tending to close said valves cause them to operate as check valves, opening to admit a flow in one direction, but automatically closing against any flow in the other direction. In the outwardly opening valve, the disk of hard rubber or other equivalent material V is held in the skeleton ring $j'$ which being guided by the sleeve $j'''$ reciprocates on the spindle J. The cup $J''$ is mounted on said spindle and the spiral spring S' being confined between said cup and the valve skeleton $j'$, operates to hold the valve closed, except when it is forced open by the outcoming current of fluid. In the same way the rubber disk V of the other valve is held in the frame work $j$ which is mounted on the spindle J''' which is guided in a sleeve having the surrounding flange or cup J' between which and the flange or cup $j''$ on the spindle J''' is pressed the spiral spring S' which operates to hold the valve closed except when overpowered by the incoming current of fluid. Each of the valve openings has a spider or skeleton J'''' for supporting the rubber disks V under the great pressure to which they are subjected. All of the combined gas and fluid cylinders, F, G, I, K, are bolted to a base plate or casting R', shown in Figs. 4 and 6, which by means of partitions shown in section in Fig. 4, and in dotted lines in Fig. 6, is divided up into a number of chambers or sets of communicating chambers, the number of said chamber or sets of chambers being equal to the number of pairs of compressed gas and liquid cylinders plus one. All of the inlet or return valves to the liquid end of the cylinders (indicated in Fig. 6 by the smaller circles) connect with one of said chambers or sets of chambers, as D'''. The outlet valves of each of said pairs of cylinders connect with one of the remaining chambers, one set of cylinders, as F, G, connecting with one chamber, or communicating set of chambers, as F'''' G'''', and the other set of cylinders with the remaining communicating set of chambers, I''', K'''. In the arrangement shown in Figs. 4 and 6, chambers F'''' and G'''' communicate by a passageway $d$ as shown by the dotted line arrow in Fig. 4, and clearly represented in Fig. 6$^b$, while the chambers I''', K''' communicate by the passage way $d'$, indicated by the full line arrow Fig. 4, and also shown in Fig. 6$^b$; the diaphragm $d''$ furnishing a partition between said passageways. If the motor were designed to run in only one direction, the pipes leading to the inlet ports of said motor or motors might communicate directly with the chamber F'''', G'''', I''', K''', into which the cylinders discharge, while the return connections from the discharge ports of the motors would communicate directly with the chamber D''', but in order that the flow of liquid may be reversed when the motor is run backward, and also that the flow may be controlled and operated so as to act as a brake on the motor, I employ the combined reversing and brake valve and cylinder illustrated in Figs. 4, 6, 6$^a$, 7, 8, 9, 9$^a$ and 9$^b$. This consists of a cylinder N which has suitable port openings, $d'''$ communicating with the chamber D''' and port openings F'''''', K'''''', communicating with the chambers F'''', K'''. At another portion of the circumference of the cylinder N are port openings $t, t', t'', t'''$, communicating with the pipes, T, T', T'', T'''. The valve operating in said cylinder is composed of two portions, N', N'', which are connected by studs $n, n$, between and around which are the openings $n'''$. The two portions of the valve, N', N'', are hollow, having openings $n''$ therethrough, and are also externally grooved so as to leave the passageways $n', n'$ about them. At one end of the valve is the yoke N''' to which the valve operating stem S is attached. The ports, $t, t', t'', t'''$, are so arranged with reference to the port openings $d''', F'''''', K''''''$, that no two are opposite, and the parts of the valve are so designed that at each reciprocation of the valve, all of the ports $t, t', t'', t'''$ are traversed, but none of the other ports are affected, in consequence of which the complete reversal of the flow of liquid through the pipes T, T', T'', T''' is brought about at every reciprocation of the valve. This is clearly shown in the illustrative views Figs. 7 and 8, the valve in Fig. 7 corresponding in position to the full line position of the reversing lever L, while the valve in Fig. 8 corresponds with the position of the reversing lever, $l$, shown in dotted lines. In said illustrative views, the ports, $t, t', t'', t'''$, are shown on the other side of the valve cylinder N from the ports $d'''$, &c., for the sake of illustration, while in the actual construction, as illustrated in Fig. 6, said ports $t, t', t'', t'''$, are on the under side of said cylinder for convenience of connection with the pipes T, T', T'', T'''.

Those parts of the mode of operation of my invention not already fully set out are as follows: The valve ports $f'', g'', i'', k''$, are arranged in pairs opposite to one another as shown in Figs. 13 and 14, and these pairs when the two halves of the valve chest are put together come at right angles to one another as indicated by the flanges $f', g', i', k'$, corresponding to said ports and appearing in Fig. 12. As a result of this arrangement, and of that of the ports in the main valves, which are opposite to one another, it is evident that the compressed air will be admitted to the cylinders in regular order, and that if the cut-off valve is in the position shown in Figs. 21 and 22 that from the first opening of the valve passages indicated in Fig. 21 to their closure, indicated in Fig. 22, there will be a period of a quarter of a revolution, so that at every moment the full pressure of the air in the reservoir is being applied to one cylinder, half a cylinder full of such air is being expanded in the cylinder next beyond the one first mentioned, while the two remaining cylinders are open to the exhaust. If however, the position of the cut-off valves be changed by oscillating the lever H the point of cut off may be materially hastened; thus, if the cut-off valve is moved sixty degrees in one direction, as shown in Figs. 23 and 24, the period from the first opening of the valve passage ways indicated in Fig. 23 to the closure thereof, indicated in Fig. 24, will only extend over one-twelfth of a revolution, so that the full pressure of the air in the reservoir will be admitted to each cylinder only during one-sixth of the downward stroke of the piston, and cut off occurring at the end of that first sixth of the stroke, the air trapped therein expands to six times its volume and one-sixth its original pressure, forcing the piston through the remainder of the stroke. Consequently, with the cut-off valve at this position, the reservoir is in direct communication with the cylinders only during one-third of the time. During the remainder of the time, the air in the cylinders is driving the motors by its expansion. The adjustment of the cut-off valve at different positions would give greater or less degrees of cut off in the well understood manner. The flow of liquid from the bottom or the liquid ends of the cylinders is controlled by the reversing valve N', N'', in the manner clearly indicated in Figs. 7 and 8. When the valve is in the position shown in Fig. 7, the flow of liquid from the chambers, F'''' and K''', is through the passage ways $n'$, to the pipe T''', and to the pipe T. This sends the current into the right hand ports of the hydraulic motors, M, M', with the connections, shown in Fig. 1, of said motors, and so rotates the vanes of said motor that the driving wheels D, D', revolve to move the car toward the right as shown in Fig. 1. The return from said motors is through the pipes T', T''', and the ports t''', t', through the hollow part n'' of the reversing valve, through the ports d''', to the common return chamber D'''. One of each of the inlet sets of valves of each pair of cylinders opens to admit the return flow, there being no pressure upon it except the pressure of the atmosphere coming through the exhaust passages, while the inlet valve to the other cylinder of that pair is kept closed by the pressure of the liquid upon it which is being forced down and out through the outlet valve into its proper chamber by the pressure of the compressed air admitted to the gas end of the said cylinder. When the reversing lever is thrown forward to the position, l, shown in dotted lines, the valve is in the position shown in Fig. 8, and connection to the common return chamber D''' is then, as shown by the arrows, through the hollow portions of the valves from the port t and the port t''. The current of outgoing liquid therefore passes through the pipes T' and T''' to the left hand ports of the hydraulic motors as shown in Fig. 1, and said motors are revolved in the opposite direction, and the car is moved toward the left. The leaving of the valve in the midway position will completely close all the ports t, t', t'', t''', and render the movement of the car in either direction impossible, thus operating as a fluid brake. The partial closing of said ports when the car is moving forward or backward, will operate to retard its motion, and thus the movements of the car are absolutely under the control of the operator, without any considerable exertion of force on his part, or any wear and tear or grinding and jerking such as results from the use of the ordinary friction brake. The four piston rods and the four cylinders being placed at equal distances apart, the cam rollers, $f'''$, $g'''$, $i'''$, $k'''$, follow one another at equal distances along the cam groove, as shown in Fig. 26, and thereby cause said pistons to operate consecutively and in regular order. This also seems to connect the two sets of cylinders together so that in case the load is partly or wholly taken off one set of cylinders by the slipping of the wheels connected thereto, that portion of the motor would not "race" or "run away" but share its surplus power with the other cylinders, the transmission taking place through the cam cylinder.

The advantages of my invention are evident in that it insures a positive, equably acting mechanism, without dead centers, and permits the economical expenditure of the power stored up in the reservoir, or generated therein, through the expansion of the gas to a low pressure before it is discharged into the exhaust.

It should be understood that while in Figs. 6, 6ª and 6ᵇ I have represented the port openings t, t', t'', t''', in the bottom of the cylinder N, as they would be arranged in practice, which arrangement would bring them at ninety degrees from the ports d''', F'''', K'''', I have for purposes of illustration and clearness in tracing the fluid currents, shown said ports t, t', t'', t''', at one hundred and eighty degrees from the ports d''', K'''', F'''', in the illustrative Figs. 7 and 8. In the same way, while in the majority of views, such as Figs. 3, 12, 13 and 14, I have shown the inlet pipe, B', and the exhaust connection, A'', as entering the valve chest at points ninety degrees apart, I have represented them, for the sake of clearness in the assembled view (Fig. 2) as entering said valve chest at points one hundred and eighty degrees apart in order to more clearly indicate the induction and exhaust connections to and from said valve chest.

Having, therefore, described my invention, what I claim as new, and desire to secure by Letters Patent, is—

1. The combination of a plurality of combined gas and liquid cylinders, pistons which fit in said cylinders and form partitions between the gas at one end and the liquid at the other end of each cylinder, a valve chest to which compressed gas is supplied, connections from said valve chest to the gas end of each of the cylinders, valves controlling said connections, mechanism connecting said pistons one to another and to the aforesaid valves, whereby the said pistons are compelled to move consecutively and also to give motion to the valves, together with inlet and outlet connections for the liquid ends of the cylinders and check valves controlling the same, substantially as described.

2. The combination of a plurality of combined gas and liquid cylinders, pistons which fit in said cylinders and form partitions between the gas at one end and the liquid at the other end of each cylinder, a valve chest to which compressed gas is supplied, connections from said valve chest to the gas end of each of the cylinders, valves controlling said connections, mechanism connecting said pistons one to another and to the aforesaid valves, whereby the said pistons are compelled to move consecutively and also to give motion to the valves, together with inlet and outlet connections for the liquid ends of the cylinders, check valves which control the same, and one or more hydraulic motors which have their inlet ports connected with the cylinder outlets, and their discharge ports connected with the cylinder inlets, substantially as described.

3. The combination of a plurality of combined gas and liquid cylinders, pistons which fit in said cylinders and form partitions between the gas at one end and the liquid at the other end of each cylinder, a valve chest to which compressed gas is supplied, connections from said valve chest to the gas end of each of the cylinders, valves controlling said connections, mechanism connecting said pistons one to another and to the aforesaid valves, whereby the said pistons are compelled to move consecutively and also to give motion to the valves, together with inlet and outlet connections for the liquid ends of the cylinders, check valves which control the same, one or more hydraulic motors which have their inlet ports connected with the cylinder outlets and their discharge ports connected with the cylinder inlets, and one or more reversing valves in the line of said connections, substantially as described.

4. The combination of two or more pairs of combined gas and liquid cylinders, pistons which fit in said cylinders and form partitions between the gas at one end and the liquid at the other end of each cylinder, proper inlet and outlet connections for the gas ends of said cylinders, a valve casing which is connected to the liquid ends of said cylinders, and which has as many chambers or sets of connected chambers as there are pairs of cylinders plus one, the outlet orifices of each pair of opposite cylinders being connected with a set of said chambers, and all of the inlet orifices of all of the cylinders being connected with the remaining chamber or set of chambers, together with proper check valves in said casing and one or more hydraulic motors which have their outlet ports connected with said last mentioned chamber or set of chambers, the inlet ports of each motor being connected with one of the first mentioned sets of chambers, substantially as described.

5. The combination of two or more pairs of combined gas and liquid cylinders, pistons which fit in said cylinders and form partitions between the gas at one end and the liquid at the other end of each cylinder, proper inlet and outlet connections for the gas ends of said cylinders, a valve casing which is connected to the liquid ends of said cylinders, and which has as many chambers or sets of chambers as there are pairs of cylinders plus one, the outlet orifices of each pair of opposite cylinders being connected with a set of said chambers, and all of the inlet orifices of all of the cylinders being connected with the remaining chamber or set of chambers, together with proper check valves in said casing and one or more hydraulic motors which have their discharge ports connected with said last mentioned chamber or set of chambers, the inlet ports of each motor being connected with one of the first mentioned sets of chambers, and a reversing valve or valves in the line of said motor connections, substantially as described.

6. The combination with two or more positively acting hydraulic motors, of a plurality of combined gas and liquid cylinders, pistons which reciprocate therein and form partitions between the gas at one end and the liquid at the other end of each of said cylinders, the common return connection to the liquid end of all of said cylinders from the discharge connections of the motors, proper supply connections to the motors from the cylinders and check valves controlling said supply and return connections, substantially as described.

7. A fluid reversing apparatus which consists of a valve casing which has a number of ports no two of which are directly opposite one another, combined with a valve composed of two hollow, externally grooved portions rigidly connected together, and apparatus for reciprocating said valve the arrangement of ports being such that the port openings on one side of the casing will be traversed at each reciprocation while the port openings on the other side of the casing will be unaffected by such reciprocation, substantially as described.

8. The combination of one or more cylinders, pistons and piston rods reciprocating therein, a revolving cam cylinder, projections on said piston rods which mesh with the grooves in said cam cylinder, a valve chest to which a fluid under pressure is supplied and which is connected with the cylinders and with an exhaust pipe, a pair of simultaneously rotating valves in said chest, and connections from said valve to the above mentioned cam cylinder, and an adjustable non-rotating cut off valve, arranged between said rotating valves and means for adjusting the same mounted on the rotating valve, substantially as described.

9. The combination of two pairs of cylinders, pistons and piston rods reciprocating therein, a valve chest to which a supply of compressed gas is furnished, a pair of simultaneously rotating valves which ride on the opposite internal faces of said valve chest, connections from one pair of the cylinders to the ports in the upper face in said valve chest, and from the other pair to the ports in the lower face, a spindle connected with said valves and by which they are rotated, a cam cylinder mounted on said spindle and projections on the above mentioned piston rods which mesh with the groove in said cam cylinder, whereby motion is transmitted to the valves from the pistons, substantially as described.

10. The combination of two pairs of cylinders, pistons and piston rods reciprocating therein, a valve chest to which a supply of compressed gas is furnished and which has proper exhaust connections, a pair of simultaneously rotating valves which ride on the opposite internal faces of said valve chest, connections from one pair of the cylinders to the ports in the upper face in said valve chest, and from the other pair to the ports in the lower face, a hollow spindle connected with said valves and by which they are rotated, a cam cylinder mounted on said spindle and projections on the above mentioned piston rods which mesh with the groove in said cam cylinder, whereby motion is transmitted to the valve from the pistons, together with a pair of non-rotating cut-off valves between said rotating valves, a spindle extending from the cut-off valves through the aforesaid hollow spindle, and adjusting apparatus connected therewith whereby the point of cut-off may be varied, substantially as described.

11. The combination of the valve chest which has ports in its upper and lower internal faces and exhaust openings at the centers of said faces, rotating valves which rest on said faces and have passage ways corresponding to said ports, and exhaust cavities which may connect the said ports with the exhaust openings, lugs on the backs of said valves which intermesh, adjustable cut-off valves which ride on the backs of the rotating valves and which also have lugs which intermesh, a hollow spindle extending from one of the rotating valves and a spindle which extends from one of said cut-off valves through the first mentioned hollow spindle, substantially as described.

In testimony whereof I affix my signature in presence of two witnesses.

WILLIAM COOPER.

Witnesses:
GEORGE P. HAMPTON,
JAMES E. MERRITT.